United States Patent
Yu et al.

(10) Patent No.: US 10,498,766 B1
(45) Date of Patent: *Dec. 3, 2019

(54) USER PRIVACY FRAMEWORK

(71) Applicant: Google LLC, Mountain View, CA (US)

(72) Inventors: Yan Yu, Palo Alto, CA (US); Michael Chu, Los Altos Hills, CA (US); Chung-Man Tam, San Francisco, CA (US); Steven Lee, San Francisco, CA (US); Ravi Jain, Palo Alto, CA (US); Tu Tu Tsao, Mountain View, CA (US); Christopher Lambert, San Francisco, CA (US)

(73) Assignee: Google LLC, Mountain View, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 15/202,425

(22) Filed: Jul. 5, 2016

Related U.S. Application Data

(63) Continuation of application No. 14/061,573, filed on Oct. 23, 2013, now Pat. No. 9,674,223, which is a continuation of application No. 12/434,285, filed on May 1, 2009, now Pat. No. 8,621,554.

(51) Int. Cl.
   *H04L 29/06* (2006.01)

(52) U.S. Cl.
   CPC ............ *H04L 63/20* (2013.01); *H04L 63/102* (2013.01); *H04L 67/42* (2013.01)

(58) Field of Classification Search
   CPC ........ H04L 63/20; H04L 67/42; H04L 63/102
   See application file for complete search history.

(56) References Cited

U.S. PATENT DOCUMENTS

| | | | |
|---|---|---|---|
| 5,720,033 A | 2/1998 | Deo | |
| 6,023,765 A | 2/2000 | Kuhn | |
| 6,130,938 A | 10/2000 | Erb | |
| 6,192,119 B1 | 2/2001 | Wilson | |
| 6,643,777 B1 | 11/2003 | Chu | |
| 6,697,478 B1 | 2/2004 | Meldrum et al. | |
| 7,653,936 B2 | 1/2010 | Oberst | |

(Continued)

OTHER PUBLICATIONS

Gianluca Dini et al., "Integration of Privacy Protection Mechanisms in Location-Based Services," IEEE Computer Society, 2013, pp. 717-723. (Year: 2013).*

(Continued)

*Primary Examiner* — Luu T Pham
*Assistant Examiner* — Canh Le
(74) *Attorney, Agent, or Firm* — Fish & Richardson P.C.

(57) ABSTRACT

A computer program product has a computer-readable storage medium having computer program instructions embodied therein for performing a method for implementing a privacy policy for a user. The method may include the user developing rules that determine whether another user (requester) can access information related to the user. The rules may be stored in a database coupled to a server and evaluated when a request is received from the requester to access the information. If a rule is satisfied by the requester, the server can return the information to the requester. The information can be returned at a level of granularity specified by the user in the satisfied rule. A privacy level can be set by the user to allow access to requesters based on the rules or to deny access to any requesters.

11 Claims, 4 Drawing Sheets

(56) References Cited

U.S. PATENT DOCUMENTS

| | | |
|---|---|---|
| 8,225,371 B2 | 7/2012 | Jones et al. |
| 8,713,055 B2 * | 4/2014 | Callahan ............... G06F 21/604 |
| | | 705/319 |
| 2002/0108109 A1 | 8/2002 | Harris et al. |
| 2002/0143735 A1 | 10/2002 | Ayi et al. |
| 2004/0117655 A1 | 6/2004 | Someshwar |
| 2005/0246303 A1 * | 11/2005 | Kumar ............. G06F 17/30637 |
| | | 706/47 |
| 2006/0010252 A1 * | 1/2006 | Miltonberger .......... G07F 17/32 |
| | | 709/245 |
| 2006/0048218 A1 | 3/2006 | Lingafelt et al. |
| 2008/0059474 A1 * | 3/2008 | Lim .................... G06F 17/3089 |
| 2008/0109871 A1 * | 5/2008 | Jacobs .................... H04L 63/20 |
| | | 726/1 |
| 2008/0134294 A1 * | 6/2008 | Mattox ............... G06F 21/6245 |
| | | 726/4 |
| 2009/0292930 A1 * | 11/2009 | Marano ............... G06F 21/6218 |
| | | 713/189 |
| 2009/0328205 A1 * | 12/2009 | Ims .................... G06F 21/6245 |
| | | 726/22 |
| 2010/0077484 A1 * | 3/2010 | Paretti ..................... H04W 4/21 |
| | | 726/26 |
| 2010/0262925 A1 * | 10/2010 | Liu ........................ G06Q 10/10 |
| | | 715/759 |
| 2013/0139215 A1 * | 5/2013 | Hu ........................ G06F 21/604 |
| | | 726/1 |
| 2014/0013447 A1 * | 1/2014 | Hotti ................... G06F 21/6209 |
| | | 726/28 |
| 2016/0203212 A1 * | 7/2016 | Motwani ............... G06F 16/288 |
| | | 707/737 |

OTHER PUBLICATIONS

Xinxiu Liu et al., "Traffic-Aware Multiple Mix Zone Placement for Protecting Location Privacy," IEEE, 2012, pp. 972-980 (Year: 2012).*

Clifton et al., "Privacy-Preserving Data Integration and Sharing," Jun. 13, 2004, ACM, pp. 19-26.

Ho et al., "Privacy Protection Issues in Social Networking Sites," 2009, IEEE, pp. 271-278.

* cited by examiner

USER PRIVACY FRAMEWORK

CROSS-REFERENCE TO RELATED APPLICATIONS

This application is a continuation of, and claims priority to U.S. patent application Ser. No. 14/061,573, titled "User Privacy Framework" filed on Oct. 23, 2013, which is a continuation of and claims priority to U.S. patent application Ser. No. 12/434,285, titled "User Privacy Framework" filed May 1, 2009, both of the which are incorporated by reference in their entirety.

FIELD OF THE INVENTION

The present application relates generally to methods and systems for implementing a user privacy policy.

BACKGROUND

Computer systems can store private or personal information. Through a network connection, such as the Internet, others can access the stored private or personal information. It is desirable to protect the information to permit access by select people in select circumstances. Conventional methods for protecting this information typically involve a system administrator setting a privacy policy for users of the computer system. Some users may have more access to the information than other users, but the information of each individual is typically protected at the same level. Because system administrators set the privacy policy, individual users have little or no control over the privacy policy for their own information. Privacy frameworks that allow a user to control their privacy policy typically suffer from being cumbersome and do not give the user full control of their privacy policy. These frameworks can lead to user frustration and can eventually lead to the user abandoning their privacy policy. Thus, what is desired is a system that helps overcome one or more of the above-described limitations.

SUMMARY

In one embodiment, a computer program product has a computer-readable storage medium having computer program instructions embodied therein for performing a method for implementing a policy for disclosing information of a first user to a second user. The method may include providing a user interface for allowing the first user to develop a first rule for determining if the second user is allowed access to the information of the first user; receiving at a server the first rule from the first user; wherein the first rule comprises a first condition; and wherein the first condition comprises one or more expressions, each expression comprising one or more dimensions selected from a plurality of dimensions and an element corresponding to each of the one or more dimensions selected from a plurality of elements; storing the first rule in a rules database; receiving a request by an application of the second user to view the information of the first user; evaluating the first rule from the rules database to determine if the first condition is satisfied; and based on the evaluation, allowing access by the second user to view the information of the first user if the second user satisfies the first condition of the first rule.

In another embodiment, a system implementing a privacy policy includes a first data storage unit for storing one or more rules, wherein the one or more rules each comprises a condition; an authorization server coupled to the first data storage unit for receiving a request from a requester for information of a user and for returning the information of the user if one or more rules are satisfied, wherein the authorization server comprises a processor for evaluating the one or more rules; a second data storage unit coupled to the authorization server for storing the information of the user; and a user interface for providing a plurality of conditions for allowing the user to develop the one or more rules and for allowing the user to add, modify, or delete the one or more rules; wherein the condition comprises one or more dimensions selected from a plurality of dimensions and an element selected from a plurality of elements corresponding to each of the one or more dimensions.

In yet another embodiment, a computer program product includes a computer readable medium having computer readable program code embodied therein for implementing a privacy policy for a first user, the computer readable program code in the computer program product including computer readable program code for providing a user interface for allowing the first user to develop a first rule comprising a first condition for determining if a second user is allowed access to the information of the first user; wherein the first condition comprises one or more dimensions selected from a plurality of dimensions and an element corresponding to each of the one or more dimensions selected from a plurality of elements; and wherein the access to the second user is denied unless the second user satisfies the condition; computer readable program code for receiving the first rule; computer readable program code for storing the first rule; computer readable program code for evaluating the first rule upon receiving a request to access the location of the first user; and computer readable program code for permitting access to the second user if the second user satisfies the condition of the first rule.

BRIEF DESCRIPTION OF THE DRAWINGS

The preferred embodiments of the present invention are illustrated by way of example and not limited to the following figures.

DETAILED DESCRIPTION

Reference will now be made in detail to the preferred embodiments of the present invention, examples of which are illustrated in the accompanying drawings.

Overview

Systems and methods described herein may be used to implement a privacy policy to protect information of a first user. A first user can be a person that desires to protect sensitive, personal, or private information, including, but not limited to the first user's location, employment, contact information, health, and online status. Although it is intended that this information can include any type of information that a first user desires to maintain in a private or semi-private nature, the exemplary embodiments herein describe systems and methods for protecting the location of the first user. The first user can establish a privacy policy that protects their own information. Although a first user may be referred to in the singular in the exemplary embodiments, it is intended that the first user can include any number of individual or groups of people or entities. Additionally, the systems and methods can implement any number of privacy policies for any number of first users.

A second user can be a person that desires to access the information of the first user. Although a second user may be referred to in the singular in the exemplary embodiments, it is intended that the second user can include any number of individual or groups of people or entities. As a result, a second user can refer to any party requesting information of the first user.

The first user can establish a privacy policy by creating and managing a set of rules. Each rule can include a condition, whereby if the second user satisfies the condition of the rule, then the second user can access the information of the first user. Optionally, the first user can determine the granularity or resolution of the information available to the second user.

The framework allows the first user to configure a privacy policy to allow a second user to view the first user's information. The privacy policy can be configured by the first user to allow for access based upon conditions including, but not limited to, the application used by the second user, the location of the first user, and the time of day. The framework also allows new rules and conditions to be added for modifying the privacy policy or establishing a new privacy policy.

System Architecture

Figure 1:
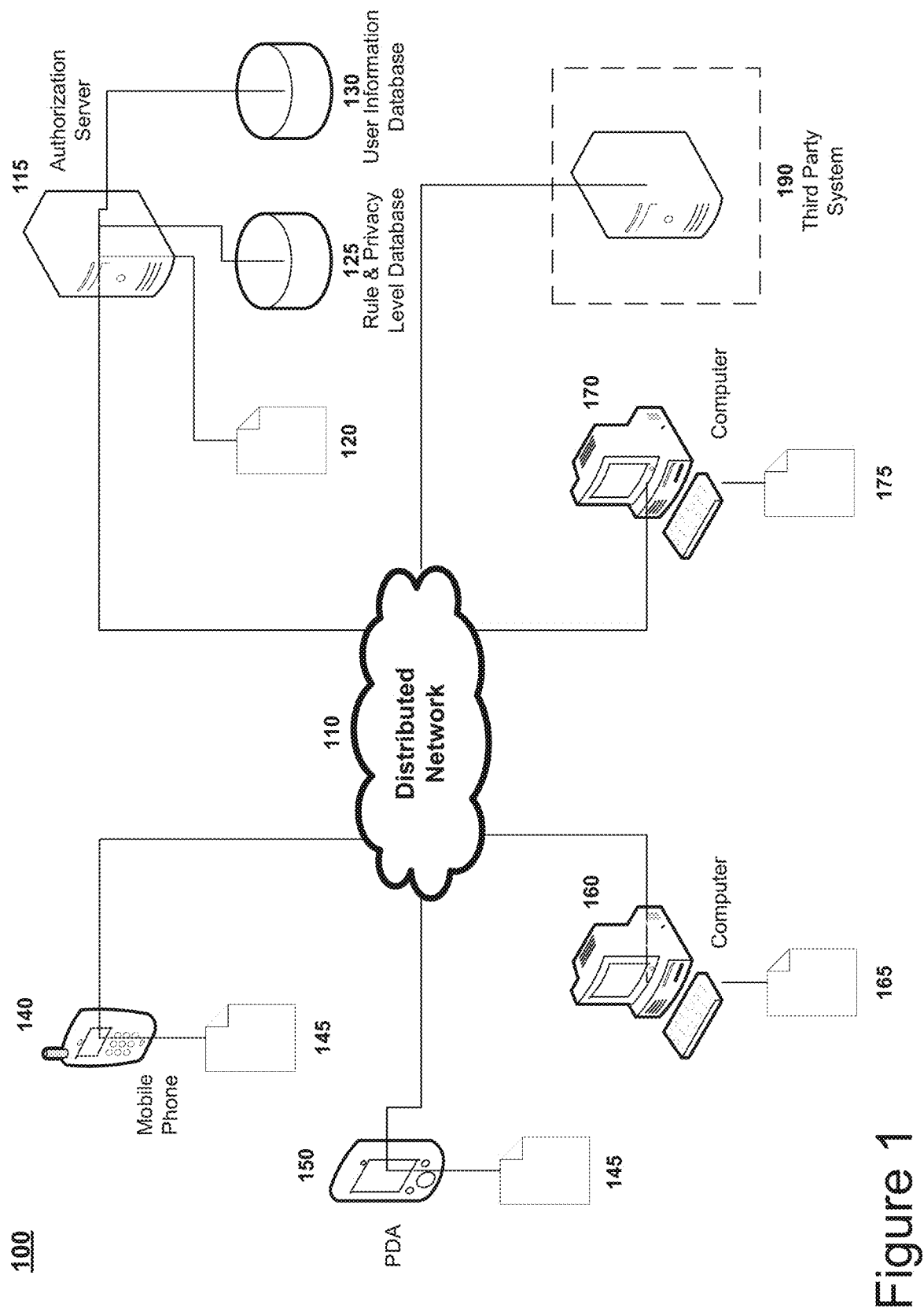
FIG. 1 shows an operating environment for implementing a user privacy policy according to an exemplary embodiment.

Referring to FIG. 1, an operating environment 100 for establishing and implementing a user's privacy policy according to an exemplary embodiment is shown. An authorization server 115 may be connected to a distributed network 110, such as the Internet, a local area network (LAN), or a wide area network (WAN). The authorization server 115 can return the first user's information (e.g., location) to a second user's requesting computer program based on a privacy level and a set of rules that may both be user-configured.

The operating environment 100 includes a front-end system that allows the first user to create and manage the privacy policy. This front-end system includes a computer program with a graphical user interface such as computer programs 145 and 160. The operating environment 100 also includes a back-end system for storing the privacy level, set of rules, and the information of the first user. The back-end system enforces the privacy level and the set of rules to determine if the second user is granted or denied access to the information of the first user. In this exemplary embodiment, the back-end system is executed by the authorization server 115.

The rules managed by the first user can be stored in a rules database 125, which can be stored in or coupled to the authorization server 115. The authorization server 115 may also comprise or be coupled to an information database 130 for storing information associated with the first user. Information stored in the database 130 may include, but is not limited to, location information, online status, contact information, employment information, health information, and user profile information. The information database 130 may store the first user's information or may request the information from the first user (or the first user's computer) upon receiving a request from a second user for that information.

The authorization server 115 may store and/or execute a computer program 120 that allows the first user to manage a privacy policy from a remote device or computer. Additionally, the computer program 120 can implement the privacy policy when the second user requests the first information from the authorization server 115. When the first user creates, modifies, establishes, views, or cancels a privacy policy, or when the second user requests the first user's information, the authorization server 115 can execute this computer program 120 to respond to the request, update the rules database 125, and access the information database 130.

The first user can access the authorization server 115 to manage a privacy policy by executing a computer program 165 on a computer 160. In an alternative embodiment, the first user can manage the privacy policy by executing a computer program 145 on a mobile device, such as a smart phone 140 or a personal data assistant (PDA) 150. The computer program 145, 165 can access the authorization server 115 through the distributed network 110 to manage the rules in the rules database 125 or update information in the information database 130. The computer program 145, 165 can have a graphical user interface along with modules and tools to allow the first user to develop conditions (e.g., which application is allowed to request the first user's information) and create a rule based on a condition. The graphical user interface may present dimensions and elements as options available to complete a condition of a rule. In one embodiment, the graphical user interface can provide a template for establishing rules. The computer program 145, 165 can also provide information to the information database, including location information from a location sensor, such as a GPS antenna.

The second user can request information about the first user through a computer program 175 executed on a computer 170 to access the authorization server 115. Alternatively, the second user can also execute a computer program on a mobile device, such as a smart phone or PDA. It is intended that other client devices of the second user may be connected to the authorization server 115 through the distributed network 110, including, but not limited to, other computers, other mobile devices, global positioning devices, and location sensors. Based on the established rules, the second user may provide information about the second user (e.g., the second user's location) in order to access the information of the first user. Accordingly, the computer program 175 may receive and transmit information, such as location information from a location sensor.

Optionally, a third party application programming interface (API) executing on a third party server 190 may connect to the authorization server 115 through the distributed network 110 to request information associated with the first user. In this embodiment, security settings may be necessary to only allow trusted third party APIs access to the authorization server 115. When the second user desires the first user's information through the third party API, the third party server 190 connects with the authorization server 115, which can authorize the second user or the third party API before allowing access to the first user's information. If the third party does not satisfy the requirements of the rules database 125, the third party cannot access the information database 130.

Process

In an exemplary embodiment, a method for implementing a policy for disclosing information of a first user to a second user is as follows. Generally, the first user creates a rule for determining if the second user is allowed access to the information of the first user. The rule can be stored in a computer database. The rule includes a condition for determining if the second user is allowed access to the information of the first user. The first user may also specify a level of resolution, including a type of information disclosure if the second user satisfies a condition. When the second user makes a request for information (e.g., location) of the first user using a computer program, the rule is evaluated to determine if the one or more conditions are satisfied. Based on the evaluation, the second user is allowed access to the location of the first user, which may be limited to the level of resolution specified by the rule. In an alternate embodiment, the first user may select a privacy level that prohibits access to the first user's information regardless of whether the second user can satisfy the applicable rules. In another embodiment, the first user may create more than one rule and each of the rules may be evaluated to determine if the second user is allowed access to the information of the first user and at what level of resolution. In yet another embodiment, the first user may choose a template for a rule and modify the template as desired to determine if the second user is allowed access to the information of the first user.

Figure 2:
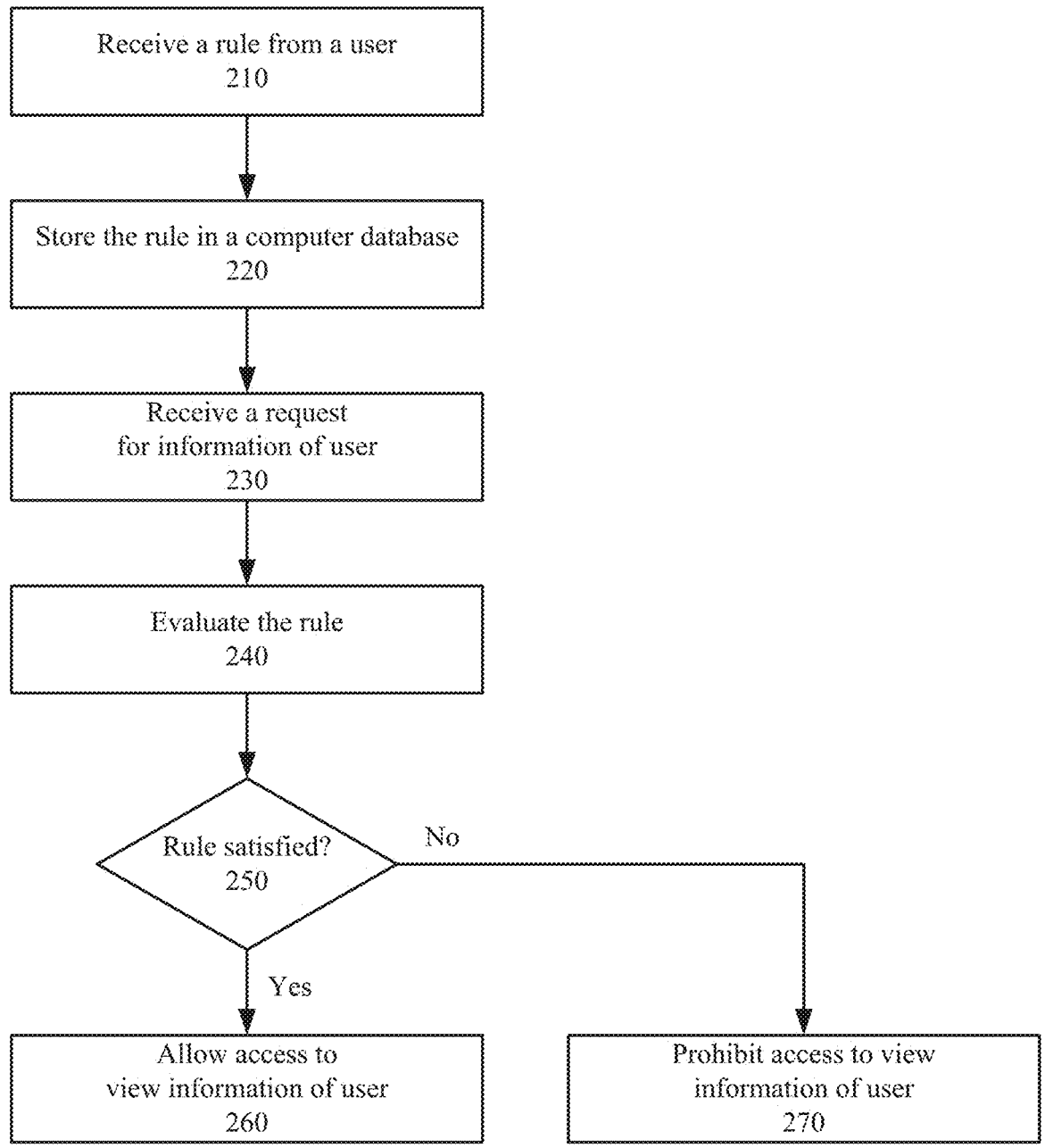
FIG. 2 shows a flow diagram of a method for implementing a policy for disclosing information of a first user to a second user according to an exemplary embodiment.

Referring to FIG. 2, a flow diagram of a method for implementing a policy for disclosing information of a first user to a second user according to an exemplary embodiment is shown. This method may be accomplished using a computer program product having a computer-readable storage medium having computer program instructions embodied therein for performing this exemplary method. Additionally, the exemplary method may be implemented using the hardware and software described in the system overview illustrated in FIG. 1.

The first user may use an input device, such as a keyboard or a mouse, of a computer to create a rule 210 for determining if the second user is allowed access to the information of the first user. Although the first user may input a rule on a computer, it is intended that the first user can also input the rule using a keyboard, mouse, stylus, or other input device for a computing device, such as a mobile device, including a smart phone or a PDA. The first user can enter the rule on a graphical user interface by creating a condition that must be satisfied by the second user for access. If a template for a rule is presented to the first user, the first user can modify the rule to add, remove, or change the conditions. If the template includes a level of resolution, the first user can also modify the level of resolution.

The condition of the rule is a set of one or more expressions in which each expression includes a dimension and a corresponding element. The rule may require that the condition be satisfied in order to allow access by the second user to the first user's information. The first user may develop the one or more expressions of the condition by selecting a dimension from a group of dimensions and specifying an element or group of elements within the dimension.

A dimension can be a characteristic of the second user, or of the environment in which the first or second user is situated, that can be used to evaluate the condition. Additional dimensions can be added to develop a condition. For example, a dimension can include, but is not limited to, an identity of the second user, an application that the second user is using to request the first user's information, the time of request by the second user, and the location of the first user or the second user. The identity of the second user can be an individual or a group, such as co-workers, friends, or family members. The application used by the second user can include a specific application or computer program such as electronic mail (e-mail), an instant messaging application, and a web browser application, such as a social networking website. The application can also be a third party API. The time of the request can include days of the week, specified time periods, and business hours. The location of the first user can include a residential location, location of employment, a building, a campus, a city block, and a state.

An element can include a specified or predetermined group or characteristic for that particular dimension. For example, the element can include a designated group of second users known as "friends." In this example of a "friends" element, if the dimension is the identity of the second user and the second user is a member of the "friends" group, then the rule may qualify the access or level of access allowed to those second users within that dimension.

The rule may also include a level of resolution. The level of resolution of the rule can qualify the granularity of the first user's information that is returned to the second user if the second user satisfies the one or more expressions of the condition of the rule. For example, in a privacy policy for accessing the first user's location, exemplary levels of resolution may be disclosing to the second user the location of the first user within a building, campus, city block, city, state, or even the location inside of a building. In this example, a first level of resolution may allow access to the first user's location at a building and a second level of resolution may allow access only to the city where the first user is located.

In one embodiment, a computer program developer may supply sets of dimensions with corresponding elements from which the first user can generate rule conditions. The computer program developer may also supply levels of resolution from which the first user can select a desired level or level of resolution. These sets of dimensions, elements, and levels of resolution can be added to, deleted from, and modified by the computer program developer. Instead of a computer program developer or system administrator setting the privacy policy of the first user, the computer program developer gives the first user the tools for managing the first user's own privacy policy.

Templates of rules may also be stored in a database on the authorization server. The first user may select a rule template and modify the dimensions or elements of the one or more expressions of the condition. Additionally, the first user may modify the level of resolution included in the rule template.

In one embodiment, the system may anticipate the rules desired by the first user and suggest at least one template. For example, the system may provide rule templates applicable to social networking websites when the system determines that the first user is establishing a privacy policy for a social networking website. In another example, as the system stores rules for different first users, the system can form a rule template based upon common conditions for a similar environment. In this example, the system can develop a rule template if a number of first users are applying a similar rule in their privacy policies.

The first user can also retrieve existing rules from the authorization server. The existing rules can be modified or canceled. The first user can modify the dimensions, and/or elements of an existing rule condition and submit the changes to the authorization server. The first user can also modify the level of resolution if a level of resolution is included in the rule.

After the rule is created or modified by the first user, the rule may be stored 220 in a computer database in/or coupled to the authorization server. The authorization server can then establish a rule policy based on the rule.

The second user may use a computer program executing on a computer or other device to request 230 the information of the first user. The computer program may send the request to the authorization server that stores the rule. Alternatively, the request may be generated by a third party API executed by another server or computer unrelated to the authorization server. The authorization server must authorize the second user and/or the third party API before allowing access to the information database.

In some embodiments, the request may be made automatically when a second user accesses a profile of the first user. For example, the location of the first user may be displayed on an Internet social networking site associated with the user. When the second user accesses the Internet social networking site of the first user, a request may be made to the authorization server in order to display the location of the first user to the second user.

In one embodiment, the request will include information about the request that can be compared to expressions of the condition in the rule to determine if the second user is granted access to the information of the first user. This information may be generated automatically when the request is made (such as time of request or identity) or polled from the second user (such as location of second user). If the requesting application in a third party API, the API may need to be configured to send the information to the authorization server.

After receiving the request, a computer program executing on the authorization server may access the privacy policy of the first user to implement the rule stored in the rules database and evaluate 240 the one or more expressions of the condition of the rule to determine if the second user is granted access. Each expression of the rule condition is evaluated against the information included in the request. The expressions are evaluated to either true or false. For example, if the expression in the rule is to allow access if the requesting application is the company e-mail system, the computer program executing on the authorization server will check to determine what application made the request. If the requesting program is the company e-mail system, then the expression will evaluate to true and access can be granted to the second user.

In this exemplary embodiment, if there is more than one expression, each of the expressions must be evaluated to true in order for the condition to be satisfied and access to be granted. In another exemplary embodiment, only one of the expressions may need to be evaluated to true in order for the condition to be satisfied and access to be granted to the second user.

The system implements the rules for the privacy policy to determine if the second user satisfies 250 each of the one or more conditions of the rules.

If the condition is satisfied, the authorization server may allow 260 the second user access to the information of the first user. Optionally, the authorization server may return the information at a specified level of resolution to the requesting computer program.

If the condition is not satisfied, the authorization server may prohibit 270 access by the second user to the information of the first user and send a denial of access to the requesting computer program.

Figure 3:
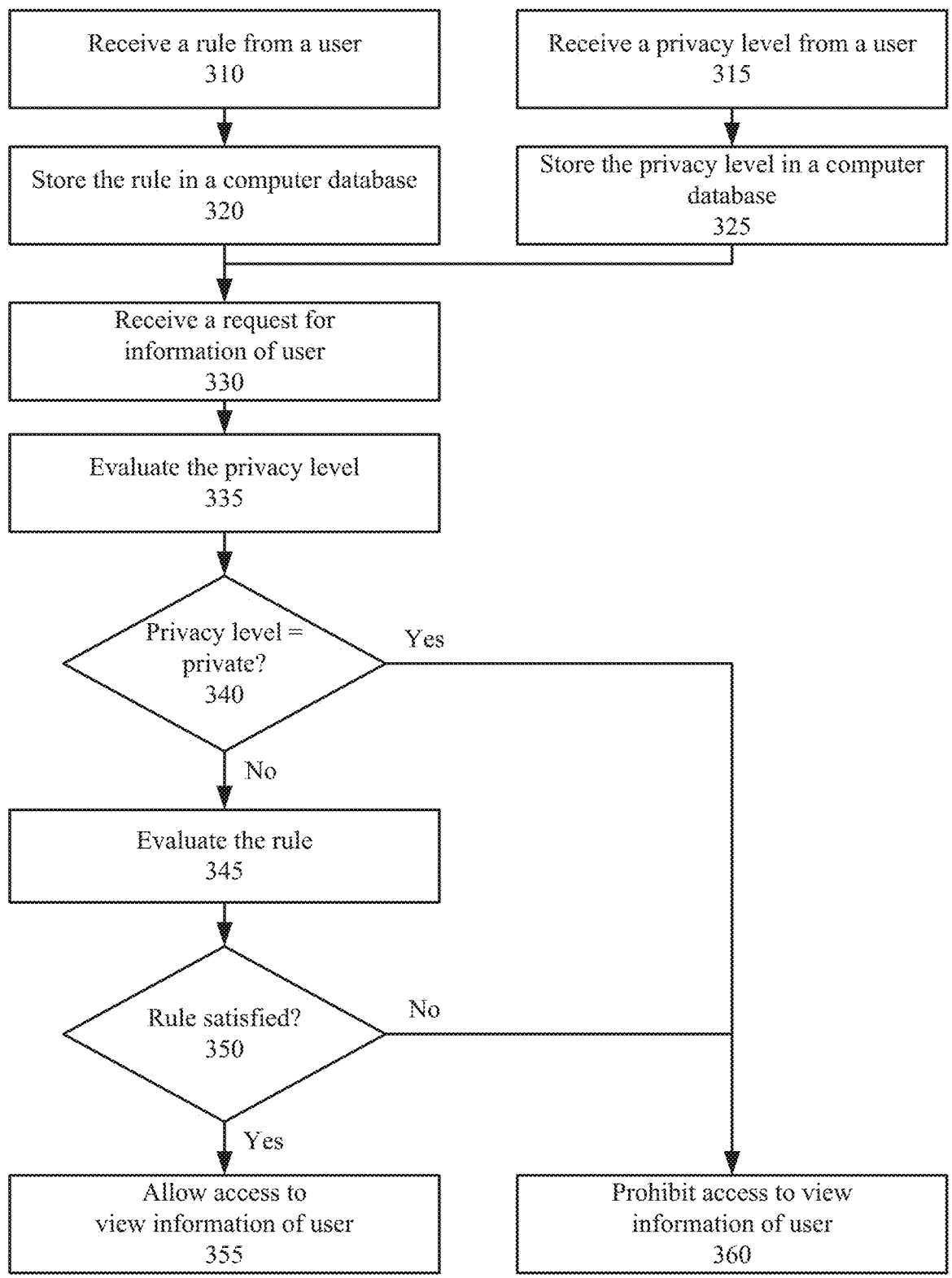
FIG. 3 shows a flow diagram of a method for implementing a policy for disclosing information of a first user to a second user according to an exemplary embodiment.

Referring to FIG. 3, a flow diagram of a method for implementing a policy for disclosing information of a first user to a second user according to an exemplary embodiment is shown. This method may be accomplished using a computer program product having a computer-readable storage medium having computer program instructions embodied therein for performing this exemplary method. Additionally, the exemplary method may be implemented using the hardware and software described in the system overview illustrated in FIG. 1.

The first user may use an input device, such as a keyboard or mouse, of a computer to create a rule 310 for determining if the second user is allowed access to the information of the first user. The rule may include a condition and a level of resolution. The first user may develop one or more expressions of a condition by selecting a dimension from a group of dimensions and specifying an element or group of elements within the dimension. The first user may also modify a pre-existing rule, such as a rule established by the first user or a rule template. As described above, the created or modified rule is received by the authorization server.

After the rule is created or modified, the rule may be stored 320 in a computer database in or coupled to the authorization server. The authorization server can then establish a rule policy based on the rule.

A first user may use an input device, such as a keyboard or mouse, of a computer to create a privacy level 315 for determining if the second user is allowed access to the information of the first user. A privacy level can limit the access of the first user's information regardless of the privacy policy rules.

For example, privacy levels may include "private," "semi-public," and "no access". A privacy level of "private" may allow the information of the first user to be stored on the authorization server and available only to the first user. As a result, when a private privacy level is implemented, even authorized second users cannot access the first user's information.

A privacy level of "semi-public" may allow the information of the first user to be stored on the authorization server and may allow access to the information of the first user if the condition of the rule is satisfied. This privacy level allows the authorization server to implement the rules established in the privacy policy.

A privacy level of "no access" may prohibit the information of the first user from being stored on the authorization server. The privacy level allows the first user to quickly and easily hide the information associated with the first user from all second users. Because the first user's information is not stored on the authorization server, the second user cannot access the first user's information, regardless of the privacy policy rules being satisfied. As a result, even the first user will not be able to access their own information while this privacy level is implemented.

After the privacy level is created, the privacy level may be stored 325 in a privacy level computer database in or coupled to the authorization server.

The second user may use a computer program executing on a computer or other device to request 330 the information of the first user. The computer program may send the request to the authorization server that stores the rule. Alternatively, the request by the second user may be generated by a third party API executed by another server or computer unrelated to the authorization server.

After receiving the request, a computer program executing on the authorization server may evaluate 335 the privacy level to determine if other users are allowed access to the information of the first user.

The authorization server can determine 340 which privacy level (e.g., private, semi-public, or no access) has been implemented. Based on this determination, the authorization server will reject the request or continue to process the request by evaluating a rule in the privacy policy.

If the privacy level is set to prohibit access to the information of the first user (e.g., if the privacy level is set to private or no access), then the authorization server may prohibit 360 access by the second user to the first user's information and send a denial of access to the requesting computer program.

If the privacy level is set to allow access to the information of the first user based on the rule, a computer program executing on the authorization server may access the rule stored in the database and evaluate 345 one or more expressions of the condition of the rule to determine if the second user is granted access to the information of the first user. Each expression of the rule condition is evaluated against the information included in the request. The expressions are evaluated to either true or false. In this exemplary embodiment, each of the expressions must be evaluated to true in order for the condition to be satisfied and access to be granted. In another exemplary embodiment, only one of the expressions may need to be evaluated to true in order for the condition to be satisfied and access to be granted to the second user.

If the condition is satisfied 350, the authorization server may allow 355 the second user access to the first user's information and, optionally, returns the information at the level of resolution of the rule to the requesting computer program.

If the condition is not satisfied, the authorization server may prohibit 360 access to the information of the first user to the second user and send a denial of access to the requesting computer program.

Figure 4:
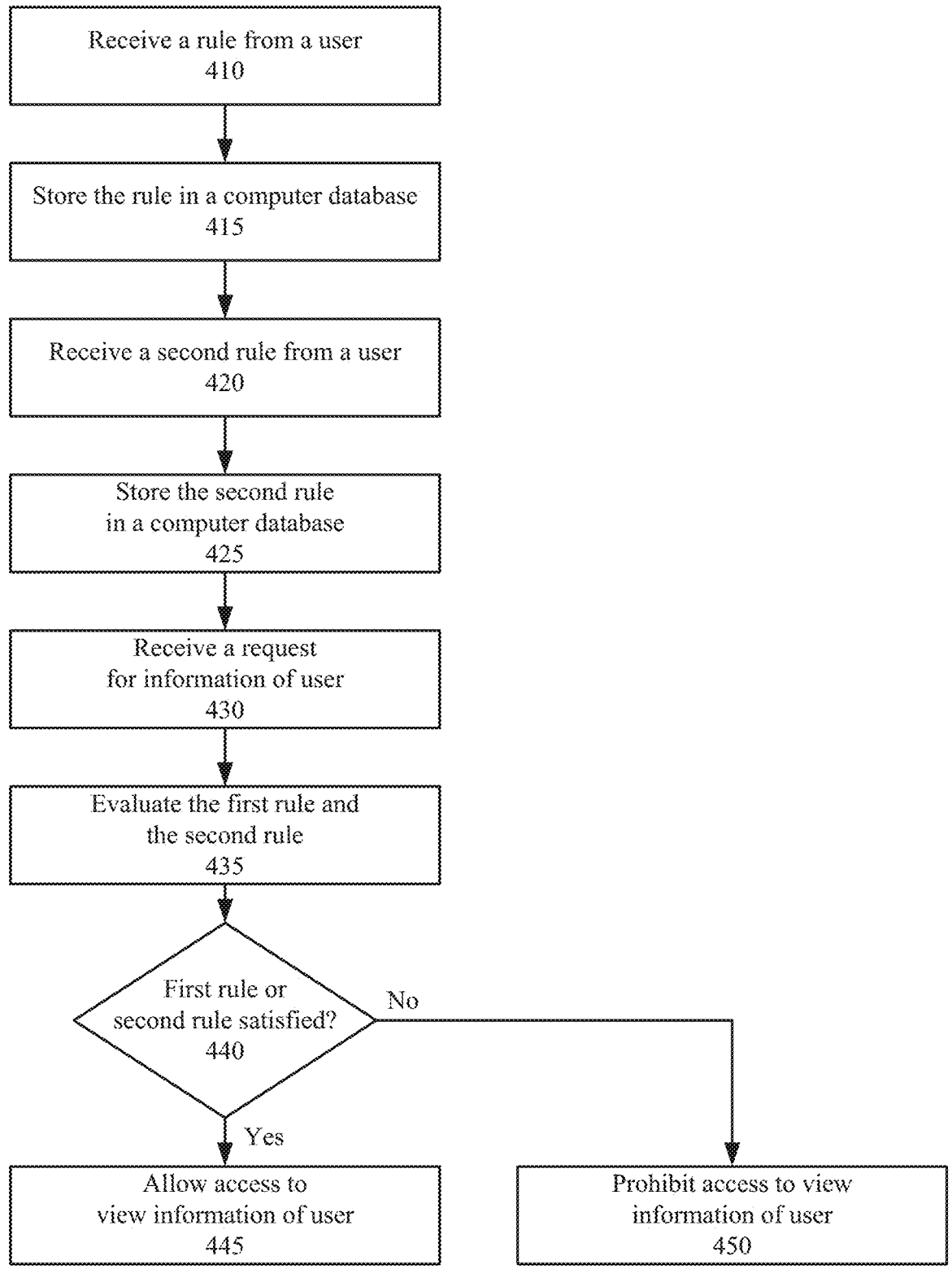
FIG. 4 shows a flow diagram of a method for implementing a policy for disclosing information of a first user to a second user according to an exemplary embodiment.

Referring to FIG. 4, a flow diagram of a method for implementing a policy for disclosing a first user's information to a second user according to an exemplary embodiment is shown. This method may be accomplished using a computer program product having a computer-readable storage medium having computer program instructions embodied therein for performing this exemplary method. Additionally, the exemplary method may be implemented using the hardware and software described in the system overview illustrated in FIG. 1.

The first user may use an input device, such as a keyboard or mouse, of a computer to create a first rule 410 for determining if the second user is allowed access to the information of the first user. Existing rules associated with the first user may be retrieved from the authorization server by the first user and modified. The first rule may include a condition with one or more expressions and a level of resolution.

After the first rule is created or modified, the first rule may be stored 415 in a computer database in or coupled to the authorization server.

The first user may use an input device, such as a keyboard or mouse, of a computer to create a second rule 420 for further limiting the type of information presented to the second user. The second rule may include a condition with one or more expressions and a level of resolution. The second rule may be independent of the first rule and may have different levels of resolution. For example, the second user may access the first user's information if the second user satisfies either of the first rule or the second rule. Additionally, the first and second rules can include different conditions that allow for different types of information to be disclosed.

After the second rule is created or modified, the second rule may be stored 425 in a computer database in or coupled to the authorization server. The authorization server can then establish a rule policy based on the two rules.

The second user may use a computer program executing on a computer or other device to request 430 the information of the first user. The computer program may send the request to the authorization server that stores the first and second rules. Alternatively, the second user's request may be generated by a third party API executed by another server or computer unrelated to the authorization server.

After receiving the request, a computer program executing on the authorization server may access the rules stored in the database and evaluate 435 the one or more expressions of the condition of the first and second rules to determine if the second user is granted access to the information of the first user.

The authorization server will provide access to the second user if the first rule or the second rule is satisfied 440.

If the condition of the first rule is satisfied or if the condition of the second rule is satisfied, the authorization server may allow 445 the second user access to the information of the first user. In one exemplary embodiment, if the condition of the first rule is satisfied but the condition of the second rule is not satisfied, the authorization server may allow the second user access to the information of the first user at the level of resolution of the first rule. If the condition of the second rule is satisfied, but the condition of the first rule is not satisfied, the authorization server may allow the second user access to the information of the first user at the level of resolution of the second rule. If the condition of the first rule and the condition of the second rule are both satisfied, the authorization server may allow the second user access to the information of the first user at the least granular level of resolution of the two rules. Alternatively, if the condition of the rule and the condition of the second rule are both satisfied, the access may be at the most granular level of resolution.

If the condition of the first rule and the condition of the second rule are both not satisfied, the authorization server may prohibit 450 access to the information of the first user to the second user and send a denial of access to the requesting computer program.

Although the exemplary method described in FIG. 4 illustrates two rules, it is understood that any number of rules and levels of resolution may be included in a privacy policy. When there are more than one rule, the access rights of the rules may have to be combined if more than one rule is satisfied to determine the level of resolution that the information is returned at. The rules are combined to grant access at the least granular level of resolution of the satisfied rules. This combination of rules is defined as the intersection of the rules. If the rule set includes only one rule and the one rule is satisfied or if the rule set includes multiple rules but only one rule is satisfied, the level of resolution is at the level of the one satisfied rule.

The privacy policy framework is not limited to rules created by the first user. A system administrator may develop system rules that apply to a group of users. Each of these rules may also include a condition with one or more expressions and a level of resolution similar to the rules generated by the first user. If system rules are implemented, the computer program executing on the authorization server may evaluate the rule set of the first user and the system rules to determine if the second user is granted access to the information of the first user. If a system rule and a user defined rule are both satisfied, then the information may be returned at a level of resolution determined by the satisfied rules. If the levels of resolution of the satisfied user defined rule and the satisfied system rule are different, then the least granular level of resolution may be returned. Alternatively, the privacy policy framework may be configured to apply a system rule in place of a user defined rule.

Example

Although the protected or sensitive information of a first user can vary, in the following examples, the information protected by the user privacy policy is the location of the user.

Referring to FIG. 1, a first user may access a computer program 165 stored on/or executing on a computer 160. The computer program 165 may display a graphical user interface on a monitor coupled to the computer 160. In the graphical user interface, a module for adding, modifying, and deleting rules may be displayed to the user. The module may include a text box or other area for defining the rule. The module may include one or more sub-modules to assist the user in defining the rule, such as a condition builder. The condition builder may include a list of dimensions, such as time of the request, and a list of elements to include in the condition such as a day of the week or hour element. The module may also include rule templates that the first user may use as a starting point in defining the rule. A list of resolution levels may also be included in the module. When generating the rule, the first user may create one or more expressions of a condition using the condition builder and optionally select a level of resolution corresponding to the condition. Optionally, the first user may create more than one rule. Each rule that is created may be saved in the database 120 in or coupled to the authorization server 115.

In this user location privacy policy embodiment, the following four dimensions may be included in the condition builder module: identity of the second user, a time of request by the second user, a location of the first user, and an application used by the second user. Each of the four dimensions may include a listing of elements associated with the dimension. Alternatively, the first user may define an element for the dimension when creating a condition. For example, if the first user creates a rule including a condition for the identity of the second user, the first user may define the identity as a specific e-mail address or a specific user name. Alternatively, the first user may choose a "friends" group from a listing of elements associated with the second user identity.

In one example of a user location privacy policy, the first user may create the following five exemplary rules:

1. If the second user is included in the first user's Internet social networking site's friends group, the location of the first user may be returned to the second user at a level of resolution of city block. This rule is an example of a rule for determining if the second user is allowed access to the location of the first user including an identity of the second user condition.

2. If the time of the request is between the hours of 5:00 PM on Friday and 9:00 AM on Monday, the location of the first user may be returned to the second user at a level of resolution of city. This rule is an example of a rule for determining if a second user is allowed access to the location of a first user including a time of request by the second user condition.

3. If the first user is on the campus of the first user's employer, the location of the first user may be returned to the second user at a level of resolution of building. This rule is an example of a rule for determining if a second user is allowed access to the location of a first user including a location of the first user condition.

4. If the application used by the second user is an unknown application associated with an Internet social networking site, the location of the first user may be returned to the second user at a level of resolution of state. This rule is an example of a rule for determining if a second user is allowed access to the location of a first user including an application used by the second user condition.

5. If the identity of the second user is a colleague, the time of the request is between the hours of 9:00 AM and 5:00 PM on the days Monday through Friday, and the location of the first user is on the campus of the user's employer, then the location of the first user may be returned to the second user at a level of resolution of location within a building. The fifth rule is an example of a rule with more than one condition. This particular exemplary rule has three conditions.

The user privacy policy is not limited to a specific list of dimensions that a user may include in the condition of the rules. A computer program developer may add new dimensions and also add new elements associated with the new dimensions for the user to include in a condition. For example, a sixth dimension may be added to the location privacy policy, such as a use of location dimension. The first user may then limit access to the location information by how the information is going to be used by the requesting application.

After creating the rule, the first user may retrieve the rule from the database 120 using the computer program 165. The first user may then modify or delete the rule from the database 120. For example, the first user may decide to modify the condition of the first rule to include an expression based on the new use of information dimension. An exemplary modified first rule may recite: If the second user is included in the first user's Internet social networking site's friends group and the use of the location information is to be used to invite the first user to an event, the location of the first user may be returned to the second user at a level of resolution of city block. After modifying the rule, the rule may be saved in the database 120.

In this user location privacy policy embodiment, the first user may also select a privacy policy from the group of: private (only first user has access to location information of first user), semi-public (allow access to other users based on rule set), and no access (do not allow location information of first user to be tracked). This privacy level feature allows the first user to hide his location quickly and easily without modifying or deleting rules. To continue with the example, the first user may select a privacy level of semi-public. This privacy level may be stored in the same database 125 as the rule set or in another database stored on/or coupled to the server 115.

While the privacy level is set to private or semi-public, the server 115 may receive and store location information associated with the first user in the database 130. This location information may be received from a mobile phone 140, a PDA 150, or any other device that is capable of transmitting location information across a distributed network 110.

In this embodiment, the second user may request the location of the first user by accessing a computer program 175 stored on/or executing by a computer 170. Alternatively, the second user may make the request using a smart phone, PDA, or any other device capable of executing an application and connecting to a distributed network.

The request may be received by the server 115. In this embodiment, the request may include the identity of second user, the time of the request, and the application that the request was generated from.

After receiving the request, a computer program 120 stored on/or executed by the server 115 evaluates the privacy level of the first user to determine if the first user desires to disclose location information. Because in this embodiment the privacy level of the first user is semi-public, the rule set of the first user may be evaluated to determine if the location information may be disclosed to the second user.

Each of the five rules are evaluated by the computer program 120 to determine if the second user is allowed access to the location of the first user and the level of resolution of the disclosed location information. The rules may be evaluated simultaneously or sequentially.

The computer program 120 evaluates each expression in each rule to either true or false. If all expressions of the rule are evaluated to true, the rule is satisfied.

For the purpose of this example, a second user is a colleague requesting the location of a first user through a company e-mail system on a Monday at 2:00 PM and the second user is not included in the first user's friends group of an Internet social networking site. Also, the first user is on the campus of his employment.

In this example, the location request may be denied unless at least one of the rules are satisfied. The first rule is not satisfied based on the exemplary location request because the second user is not included in the first user's friends group of an Internet social networking site. The second rule is not satisfied because the time of the request is not within the time period specified in the condition of the second rule. The third rule is satisfied because the first user is on the campus of the first user's employer. The fourth rule is not satisfied because the application is the known company e-mail system. The fifth rule is satisfied because the identity of the second user is a colleague, the time of the request is between the hours of 9:00 AM and 5:00 PM on the days Monday through Friday, and the location of the first user is on the campus of the user's employer.

Because more than one rule is satisfied (Rules 3 and 5) and the level of resolution of the two rules are not the same, a determination is made by the computer program 125 as to which resolution is returned to the second user. In one exemplary embodiment, the level of resolution that is most restrictive is returned, such as the building where the first user is located. Alternatively, the level of resolution that is least restrictive may be returned, such as the location within the first user's building. After a permissible level of resolution has been determined by the computer program 125, the location of the first user is sent to the computer program 175 that generated the request at the level of resolution.

In order to increase the performance of the user privacy policy, rules may be indexed based on one of the conditions of the rule so that every rule does not have to be evaluated. In this example, the fifth rule includes the only condition of the third rule. If the level of resolution of both rules were the same, the third rule would not need to be evaluated.

In another exemplary embodiment of a privacy policy framework, the first user may be able to select one or more applications that the user trusts to share information with and create rules using other dimensions. Requests generated by an application that the user does not trust may be denied without evaluating the rules. This embodiment allows for similar levels of privacy protection while making the framework simpler for the users.

General

The embodiments described above are intended to be exemplary. One skilled in the art recognizes that numerous alternative components and embodiments that may be substituted for the particular examples described herein and still fall within the scope of the invention.

What is claimed is:

1. A computer-implemented method comprising:
   providing, by a server, a graphical user interface for receiving a policy from a first user, the policy for selectively allowing access by a second user to information of the first user, wherein the graphical user interface displays a suggested policy that is automatically generated based on other policies that were previously received from other users;
   receiving, at the server, the policy comprising a first condition specifying a predefined location of the second user and an application of the second user that is authorized to request the information, and a first level of resolution specifying a first level of granularity with which to share the information of the first user with the second user when the first condition is satisfied during a first time period, and a different, second level of resolution specifying a second level of granularity with which to share the information of the first user with the second user when the first condition is satisfied during a second time period, wherein the first level of granularity is time-variant;
   receiving, at the server, a request from a first application of the second user to access the information;
   determining that (i) the first application of the second user from which the request to access the information was received matches the application of the second user that specified by the first condition as authorized to request the information, and (ii) a current location of the second user matches the predefined location of the second user that is specified by the first condition;
   in response to determining that (i) the first application of the second user from which the request to access the information was received matches the application of the second user that specified by the first condition as authorized to request the information, and (ii) the current location of the second user matches the predefined location of the second user that is specified by the first condition, selecting one of the first level of granularity or the second level of granularity with which to share the information of the first user with the second user based on whether a time during which the request was received is associated with the first time period or the second time period, respectively;
   generating data corresponding to the current location of the first user in accordance with the selected level of granularity; and
   selectively allowing the second application to access the data corresponding to the current location of the user as specified by the selected level of granularity.

2. The method of claim 1, wherein the first condition further specifies a time of a request during which the application of the second user is authorized to request the information.

3. The method of claim 1, wherein the first condition further specifies an identity of the second user.

4. The method of claim 1, wherein the first condition further specifies restrictions on usage of the information of the first user that are to be applied to the second application upon receiving selective access.

5. A system comprising:
   one or more computers and one or more storage devices storing instructions that are operable, when executed by the one or more computers, to cause the one or more computers to perform operations comprising:

providing, by a server, a graphical user interface for receiving a policy from a first user, the policy for selectively allowing access by a second user to information of the first user, wherein the graphical user interface displays a suggested policy that is automatically generated based on other policies that were previously received from other users;

receiving, at the server, the policy comprising a first condition specifying a predefined location of the second user and an application of the second user that is authorized to request the information, and a first level of resolution specifying a first level of granularity with which to share the information of the first user with the second user when the first condition is satisfied during a first time period, and a different, second level of resolution specifying a second level of granularity with which to share the information of the first user with the second user when the first condition is satisfied during a second time period, wherein the first level of granularity is time-variant;

receiving, at the server, a request from a first application of the second user to access the information;

determining that (i) the first application of the second user from which the request to access the information was received matches the application of the second user that specified by the first condition as authorized to request the information, and (ii) a current location of the second user matches the predefined location of the second user that is specified by the first condition;

in response to determining that (i) the first application of the second user from which the request to access the information was received matches the application of the second user that specified by the first condition as authorized to request the information, and (ii) the current location of the second user matches the predefined location of the second user that is specified by the first condition, selecting one of the first level of granularity or the second level of granularity with which to share the information of the first user with the second user based on whether a time during which the request was received is associated with the first time period or the second time period, respectively;

generating data corresponding to the current location of the first user in accordance with the selected level of granularity; and selectively allowing the second application to access the data corresponding to the current location of the user as specified by the selected level of granularity.

6. The system of claim 5, wherein the first condition further specifies a time of a request during which the application of the second user is authorized to request the information.

7. The system of claim 5, wherein the first condition further specifies an identity of the second user.

8. The system of claim 5, wherein the first condition further specifies restrictions on usage of the information of the first user that are to be applied to the second application upon receiving selective access.

9. A computer program product, encoded on one or more non-transitory computer storage media, comprising instructions that when executed by one or more computers cause the one or more computers to perform operations comprising:

providing, by a server, a graphical user interface for receiving a policy from a first user, the policy for selectively allowing access by a second user to information of the first user, wherein the graphical user interface displays a suggested policy that is automatically generated based on other policies that were previously received from other users;

receiving, at the server, the policy comprising a first condition specifying a predefined location of the second user and an application of the second user that is authorized to request the information, and a first level of resolution specifying a first level of granularity with which to share the information of the first user with the second user when the first condition is satisfied during a first time period, and a different, second level of resolution specifying a second level of granularity with which to share the information of the first user with the second user when the first condition is satisfied during a second time period, wherein the first level of granularity is time-variant;

receiving, at the server, a request from a first application of the second user to access the information;

determining that (i) the first application of the second user from which the request to access the information was received matches the application of the second user that specified by the first condition as authorized to request the information, and (ii) a current location of the second user matches the predefined location of the second user that is specified by the first condition;

in response to determining that (i) the first application of the second user from which the request to access the information was received matches the application of the second user that specified by the first condition as authorized to request the information, and (ii) the current location of the second user matches the predefined location of the second user that is specified by the first condition, selecting one of the first level of granularity or the second level of granularity with which to share the information of the first user with the second user based on whether a time during which the request was received is associated with the first time period or the second time period, respectively;

generating data corresponding to the current location of the first user in accordance with the selected level of granularity; and selectively allowing the second application to access the data corresponding to the current location of the user as specified by the selected level of granularity.

10. The product of claim 9, wherein the first condition further specifies a time of a request during which the application of the second user is authorized to request the information.

11. The product of claim 9, wherein the first condition further specifies an identity of the second user.

* * * * *